United States Patent
Bucco

(10) Patent No.: US 10,493,675 B2
(45) Date of Patent: Dec. 3, 2019

(54) METHOD FOR MOLDING A RESILIENT MATERIAL AROUND A RIGID WORK PIECE

(71) Applicant: Delphi Technologies, Inc., Troy, MI (US)

(72) Inventor: Peter T. Bucco, Cortland, OH (US)

(73) Assignee: Aptiv Technologies Limited, Barbados (BB)

(*) Notice: Subject to any disclaimer, the term of this patent is extended or adjusted under 35 U.S.C. 154(b) by 293 days.

(21) Appl. No.: 15/454,280

(22) Filed: Mar. 9, 2017

(65) Prior Publication Data
US 2018/0257274 A1    Sep. 13, 2018

(51) Int. Cl.
| | | |
|---|---|---|
| *B29C 45/14* | (2006.01) | |
| *B29C 45/00* | (2006.01) | |
| *F16J 15/10* | (2006.01) | |
| *H01R 43/00* | (2006.01) | |
| *H01R 43/18* | (2006.01) | |
| *B29C 45/44* | (2006.01) | |
| *B29K 83/00* | (2006.01) | |
| *B29L 31/34* | (2006.01) | |

(52) U.S. Cl.
CPC .... *B29C 45/14065* (2013.01); *B29C 45/0025* (2013.01); *B29C 45/14598* (2013.01); *F16J 15/102* (2013.01); *F16J 15/108* (2013.01); *H01R 43/005* (2013.01); *H01R 43/18* (2013.01); *B29C 45/4407* (2013.01); *B29C 2045/0037* (2013.01); *B29C 2045/14131* (2013.01); *B29K 2083/00* (2013.01); *B29K 2995/007* (2013.01); *B29L 2031/34* (2013.01)

(58) Field of Classification Search
CPC ........ B29C 45/14598; B29C 45/14065; H01R 43/005
See application file for complete search history.

(56) References Cited

U.S. PATENT DOCUMENTS

| | | |
|---|---|---|
| 4,724,111 A | 2/1988 | Iwata et al. |
| 5,306,459 A | 4/1994 | Thomason et al. |
(Continued)

FOREIGN PATENT DOCUMENTS

| | | |
|---|---|---|
| CA | 2091950 A1 | 10/1993 |
| JP | 61293821 A | 12/1986 |
(Continued)

*Primary Examiner* — Xiao S Zhao
(74) *Attorney, Agent, or Firm* — Robert J. Myers

(57) ABSTRACT

A method of forming a resilient seal about a work piece is presented. The method includes the steps of providing a work piece defining a rib circumferentially protruding from an outer surface about a longitudinal axis of the work piece and providing a mold. The mold defines a first cavity configured to receive the work piece, a second cavity circumferentially extending about the longitudinal axis of the work piece and in communication with the first cavity, and a port in communication with the second cavity. The method further includes the steps of inserting the work piece within the first cavity such the rib is circumferentially in intimate contact with an inner surface of the first cavity, introducing a curable resilient material into the port, thereby filling the second cavity with the resilient material, curing the resilient material, and then removing the work piece from the mold.

10 Claims, 6 Drawing Sheets

(56) References Cited

U.S. PATENT DOCUMENTS

| | | | |
|---|---|---|---|
| 5,634,498 A * | 6/1997 | Nishida | F16L 11/08 138/137 |
| 5,683,647 A | 11/1997 | Kawasaki et al. | |
| 7,422,426 B2 * | 9/2008 | Saeki | B29C 45/0025 264/328.8 |
| 2004/0199242 A1 * | 10/2004 | Hong | A61F 2/07 623/1.16 |
| 2011/0293925 A1 | 12/2011 | Klann et al. | |
| 2015/0295346 A1 | 10/2015 | Campbell et al. | |
| 2017/0259476 A1 | 9/2017 | Suzuki | |

FOREIGN PATENT DOCUMENTS

| | | |
|---|---|---|
| JP | 05185492 A | 7/1993 |
| JP | 2001343092 A | 12/2001 |
| JP | 2011046004 A | 3/2011 |
| JP | 2015201445 A | 11/2015 |
| JP | 2016097645 A | 5/2016 |
| WO | 9400287 A1 | 1/1994 |

* cited by examiner

METHOD FOR MOLDING A RESILIENT MATERIAL AROUND A RIGID WORK PIECE

TECHNICAL FIELD OF THE INVENTION

The invention generally relates to methods of molding a resilient material, and more particularly relates to a method of molding a resilient material around a rigid work piece.

BACKGROUND OF THE INVENTION

Known process for overmolding silicone onto a plastic component involves using an upper mold plate and a lower mold plate forming a cavity therebetween. The plastic component is placed into the cavity and then the upper and lower mold plates are closed and liquid silicone is injected into the mold and cured about the plastic component to form a finished component. The upper and lower mold plates are then separated and the finished component is removed from the removed from the cavity. The problem with this technique is that during the injection of the silicone material an interference fit between the plastic component and the mold cavity is required. The upper and lower mold plates are machined to very tight tolerances. However, it is difficult to maintain the same tight tolerances for the plastic component.

If the plastic component is undersized, this will cause the mold cavity to have an excessive clearance. Since silicone has such a low viscosity, a thin layer of silicone will squirt out between the cavity and the component creating unwanted excess material in what is commonly called "flashing". This flashing must then be removed from the component during an additional reworking process which not only increases manufacturing labor and time, but may also cause damage to the component or the silicone seal. On the other hand, if the plastic component is oversized, this will cause loading the component into the cavity to be difficult and create a misalignment that could lead to damage of the mold and/or the component, This the finished component will not be usable and will need to be scrapped.

Alternatively, the plastic component could be machined to a tight enough tolerance to eliminate over or undersized components. However, the machining operation would undesirable increase manufacturing costs and time of the plastic component.

An improved method of forming a silicone seal around a plastic component that compensates for dimensional variations in the component remains desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to an embodiment, an method of forming a resilient seal about a work piece is provided. The method includes the steps of providing a work piece defining a rib circumferentially protruding from an outer surface about a longitudinal axis of the work piece and providing a mold. The mold defines a first cavity configured to receive the work piece, a second cavity circumferentially extending about the longitudinal axis of the work piece and in communication with the first cavity, and a port in communication with the second cavity. The method further includes the steps of inserting the work piece within the first cavity such the rib is circumferentially in intimate contact with an inner surface of the first cavity, introducing a curable resilient material into the port, thereby filling the second cavity with the resilient material, curing the resilient material, and then removing the work piece from the mold.

The rib may be at least partially deformed as the work piece is inserted within the first cavity. The work piece may defines a third cavity circumferentially extending about the longitudinal axis and wherein the third cavity is in communication with the second cavity when the work piece is inserted within the first cavity. The rib may have a generally square cross sectional profile with a height of 0.04 mm and a width of 0.04 mm. The rib may be located rearward of the third cavity. The work piece may also define a second rib that circumferentially protrudes from the outer surface about the longitudinal axis of the work piece. This second rib may be located forward of the third cavity.

The curable resilient material may be a silicone based material. The work piece may formed of a material such as polybutylene terephthalate (PBT), polyethylene terephthalate (PET), polyamide (PA), polycarbonate (PC), polypropylene (PP), and/or acrylonitrile butadiene styrene (ABS).

The mold may be a one piece unitary mold the work piece may be inserted into the first cavity through an opening defined by the first cavity. The hardness of the mold may be greater than the hardness of the work piece. The work piece may be an electrical connector body.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

The method of forming a resilient seal around a work piece, for example a silicone environmental seal around a plastic electrical connector body, is described herein. The work piece includes a deformable rib that is in intimate contact with the inner walls of a mold used to form the seal about the work piece. This rib forms a dam that inhibits the material forming the seal to flow into areas of the mold in which it is not desired, thereby reducing the likelihood of "flashing" on the work piece.

In the following description, terms describing orientation such as "longitudinal" will refer to the mating axis X while "lateral" should be understood to refer to an axis perpendicular to the mating axis X, which is not necessarily the transverse axis. Furthermore, other terms such as "top" or "bottom" should be understood relative to an axis perpendicular to the mating axis X, which is not necessarily the vertical axis. As used herein the terms "front" and "forward" refer to a longitudinal orientation referenced towards the end of the work piece firstly inserted to the mold and the terms "back", "rear", "rearward", and "behind" refer to a longitudinal orientation referenced towards the end of the work piece lastly inserted to the mold.

Figure 1:
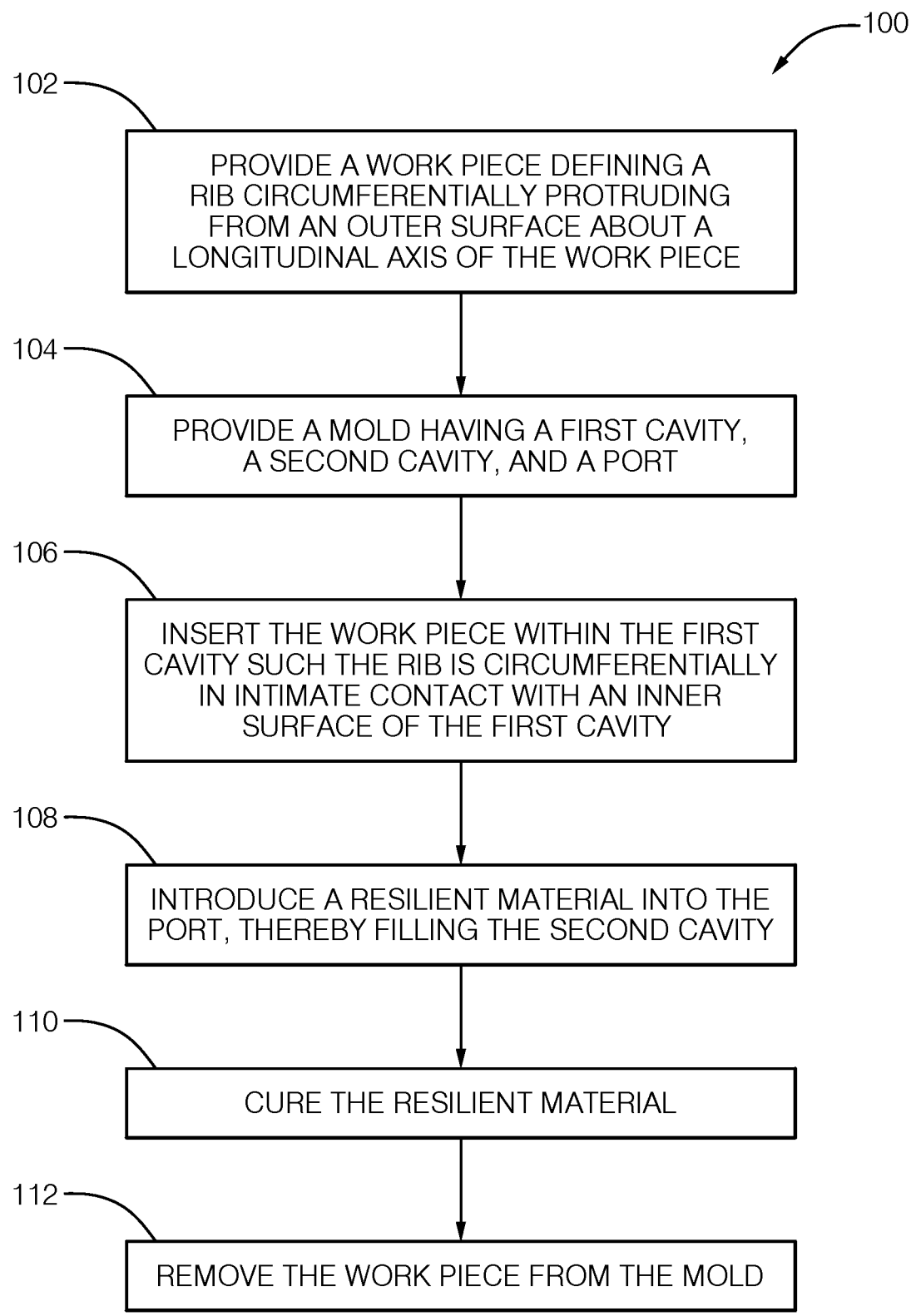
FIG. 1 is a flow chart of a method of method of forming a resilient seal about a work piece in accordance with one embodiment.

FIG. 1 illustrates a non-limiting method 100 of method of forming a resilient seal about a work piece. The method 100 includes the following steps.

Figure 2B:
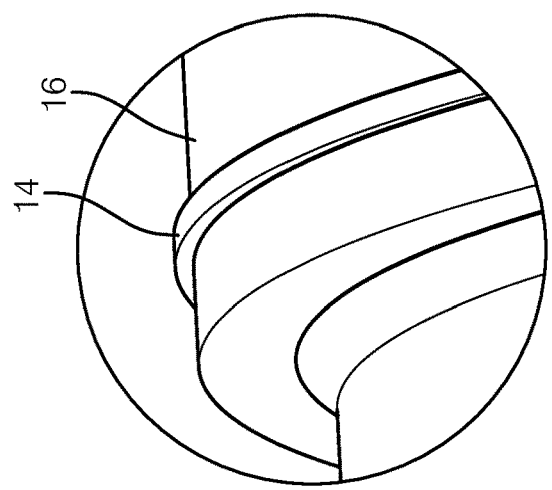
FIG. 2B is a close up perspective view of the rib of FIG. 2A in accordance with one embodiment.
Figure 2A:
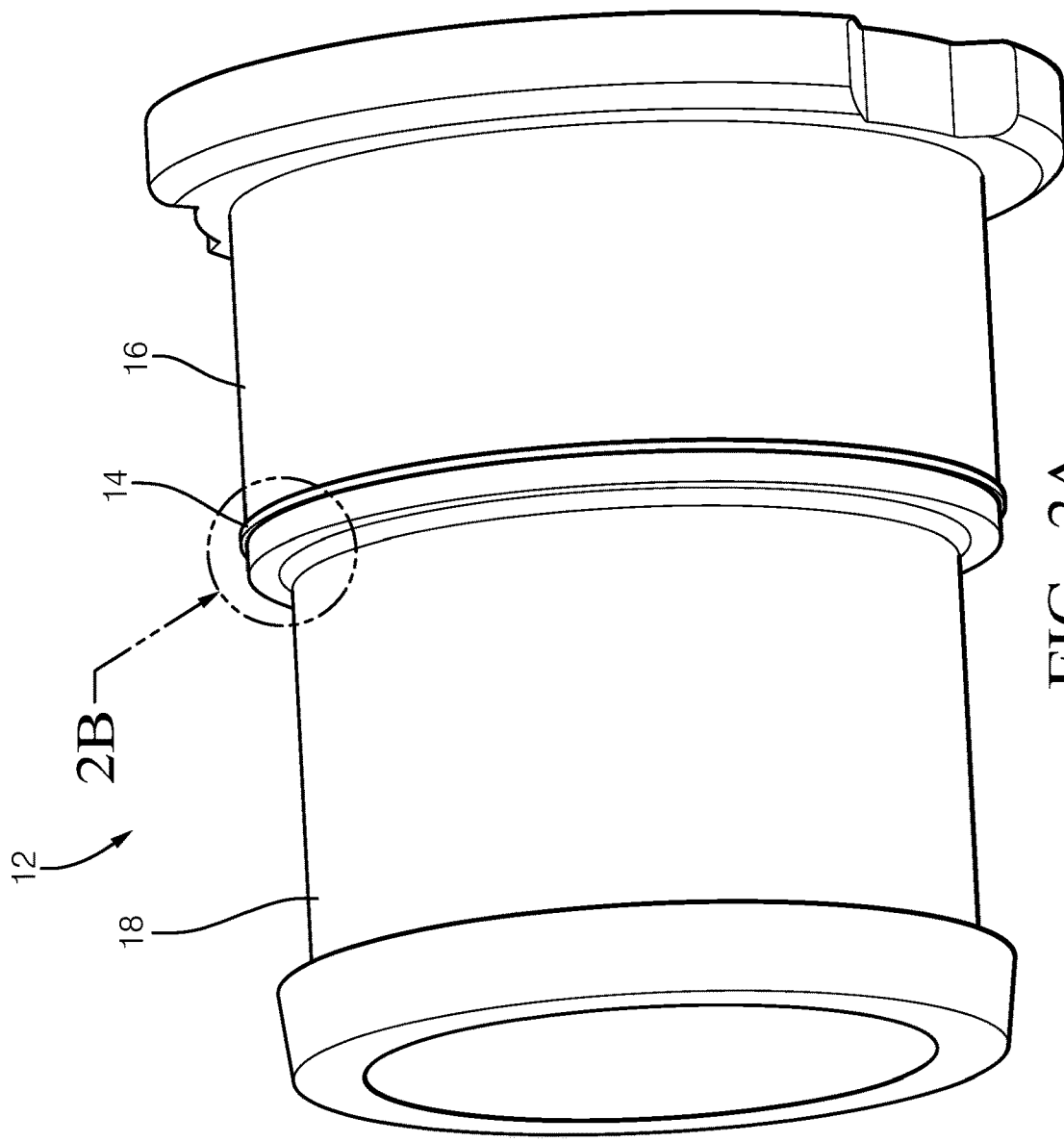
FIG. 2A is a perspective view of a work piece having defining a rib circumferentially protruding from an outer surface about a longitudinal axis of the work piece in accordance with one embodiment.

STEP 102, PROVIDE A WORK PIECE DEFINING A RIB CIRCUMFERENTIALLY PROTRUDING FROM AN OUTER SURFACE ABOUT A LONGITUDINAL AXIS OF THE WORK PIECE, includes providing a work piece 12, a non-limiting example of which is illustrated in FIG. 2A. The work piece 12 defines a rib 14 that protrudes from an outer surface 16 of the work piece 12 and circumferentially extends about a longitudinal axis X of the work piece. The outer surface 16 of the work piece 12 also defines a work piece cavity 18 circumferentially extending about the longitudinal axis X of the work piece 12. The rib 14 may be located rearward of the work piece cavity 18. The work piece 12 illustrated in this example is an electrical connector body and will hereinafter referred to as the connector body 12. The connector body 12 is formed of a dielectric material such as polybutylene terephthalate (PBT), polyethylene terephthalate (PET), polyamide (PA), polycarbonate (PC), polypropylene (PP), or acrylonitrile butadiene styrene (ABS). As best shown in FIG. 2B, the rib 14 has a generally square cross sectional profile and preferably has a height of 0.04 mm and a width of 0.04 mm.

Figure 3:
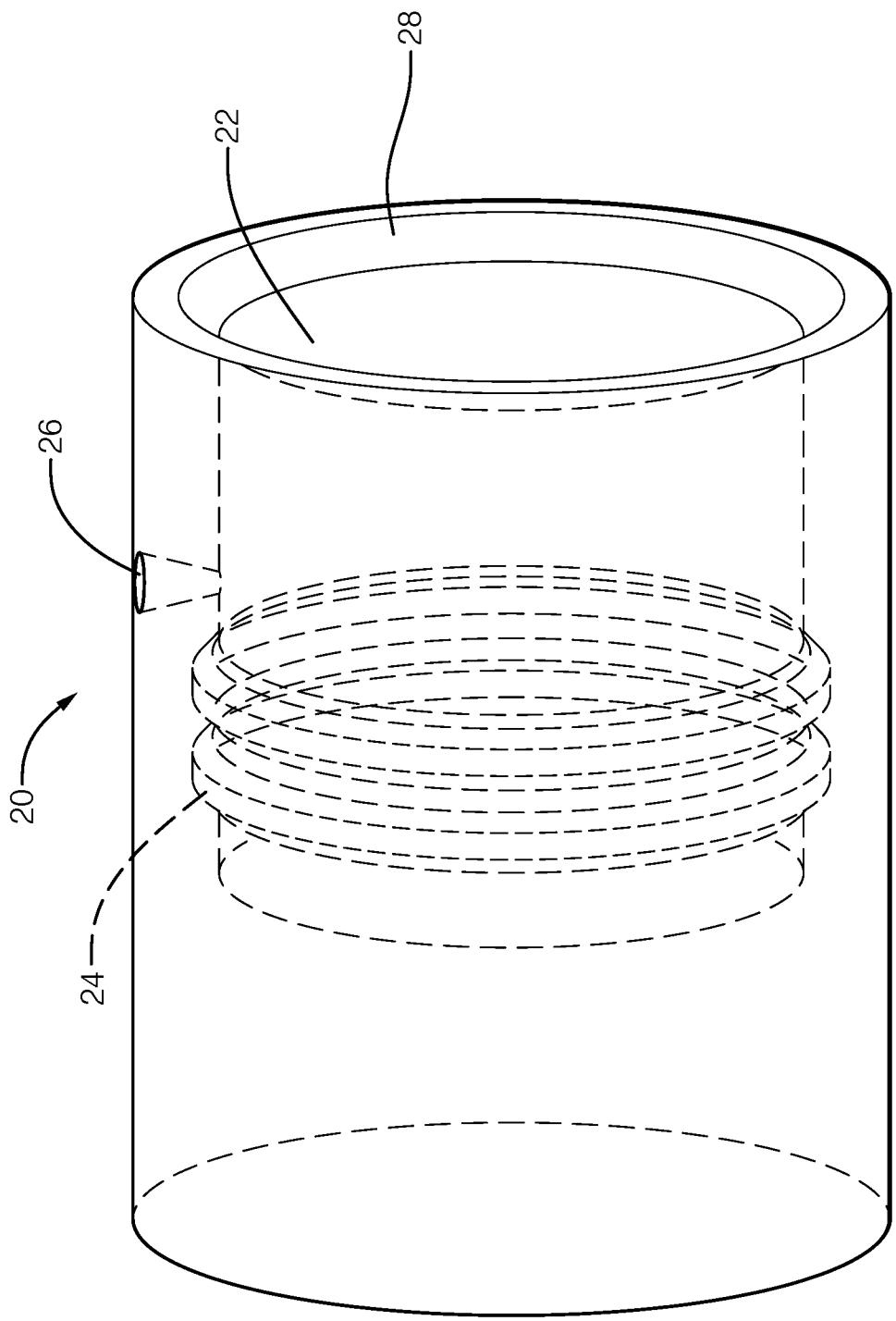
FIG. 3 is a cut away view of a mold defining a first cavity configured to receive the work piece of FIG. 2A, a second cavity circumferentially extending about the longitudinal axis of the work piece and in communication with the first cavity, and a port in communication with the second cavity in accordance with one embodiment.

STEP 104, PROVIDE A MOLD HAVING A FIRST CAVITY, A SECOND CAVITY, AND A PORT, includes providing a mold 20, a non-limiting example of which is illustrated in FIG. 3. The mold 20 is configured for a secondary molding operation of molding a resilient seal about the connector body 12. The mold 20 defines a first cavity 22 that is configured to receive the connector body 12, hereinafter referred to as the receiving cavity 22. The mold also defines a second cavity 24 circumferentially extending about the longitudinal axis X of the mold 20 in which the resilient seal is formed, hereinafter referred to as the seal cavity 24. The seal cavity 24 is open to and in communication with the receiving cavity 22. The mold 20 also defines a port 26 configured to receive a resilient material, such as a silicone based material, in a liquid, fluid, or viscous form. The port 26 is in communication with the seal cavity 24. The hardness of the material forming the mold 20 is preferably greater than the hardness of the material forming the connector body 12. Typically the mold 20 is formed of a tool grade steel. The mold 20 is a one piece unitary mold. The connector body 12 is inserted into the receiving cavity 22 through an opening 28 defined by the receiving cavity 22. The work piece cavity 18 is in communication with the seal cavity 24 when the connector body 12 is inserted within the receiving cavity 22.

Figure 4:
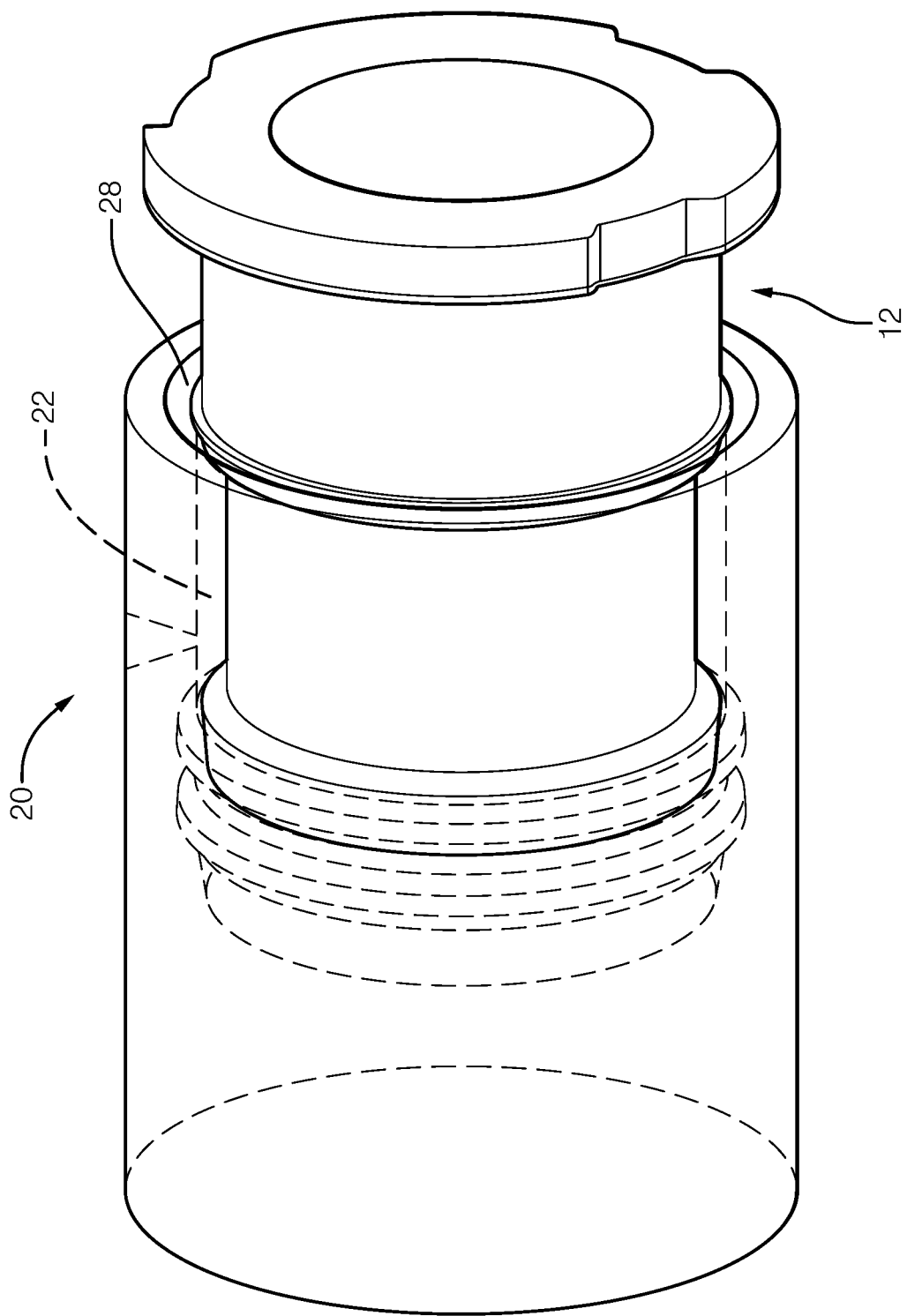
FIG. 4 is a cut away view of the step of inserting the work piece of FIG. 2A into the mold of FIG. 3 in accordance with one embodiment.
Figure 5A:
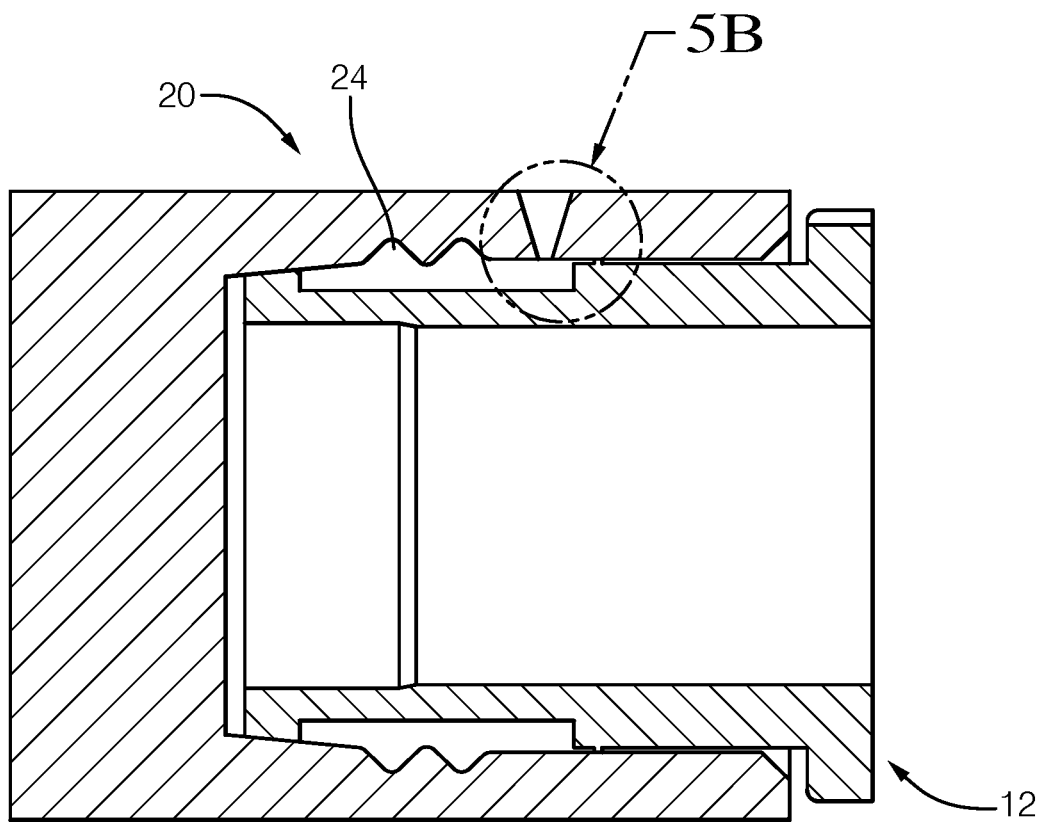
FIG. 5A is a cross section view of the work piece of FIG. 2A inserted within the first cavity of the mold of FIG. 3 such the rib is circumferentially in intimate contact with an inner surface of the first cavity in accordance with one embodiment
Figure 5B:
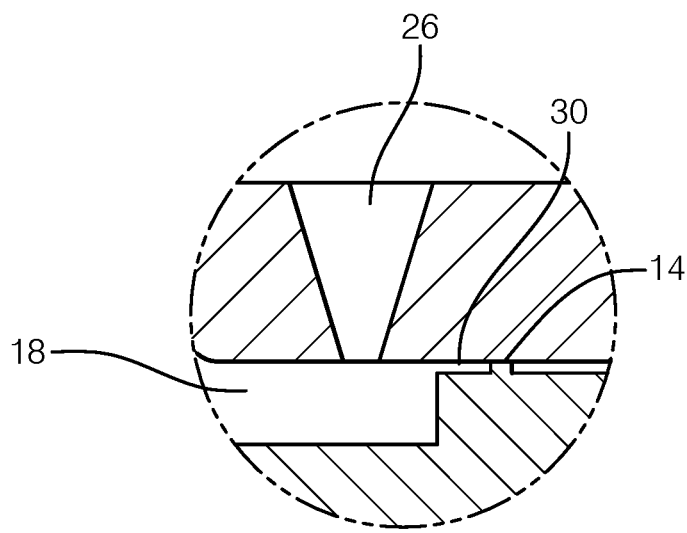
FIG. 5B is a close up cross section view of the rib in intimate contact with an inner surface of the first cavity in accordance with one embodiment.

STEP 106, INSERT THE WORK PIECE WITHIN THE FIRST CAVITY SUCH THE RIB IS CIRCUMFERENTIALLY IN INTIMATE CONTACT WITH AN INNER SURFACE OF THE FIRST CAVITY, includes inserting the connector body 12 within the receiving cavity 22 as shown in FIG. 4 such the rib 14 is circumferentially in intimate contact with an inner surface 30 of the receiving cavity 22 as illustrated in FIGS. 5A and 5B. As the rib 14 comes into intimate contact with the inner surface 30 of the receiving cavity 22, the rib 14 is at least partially deformed.

Figure 6A:
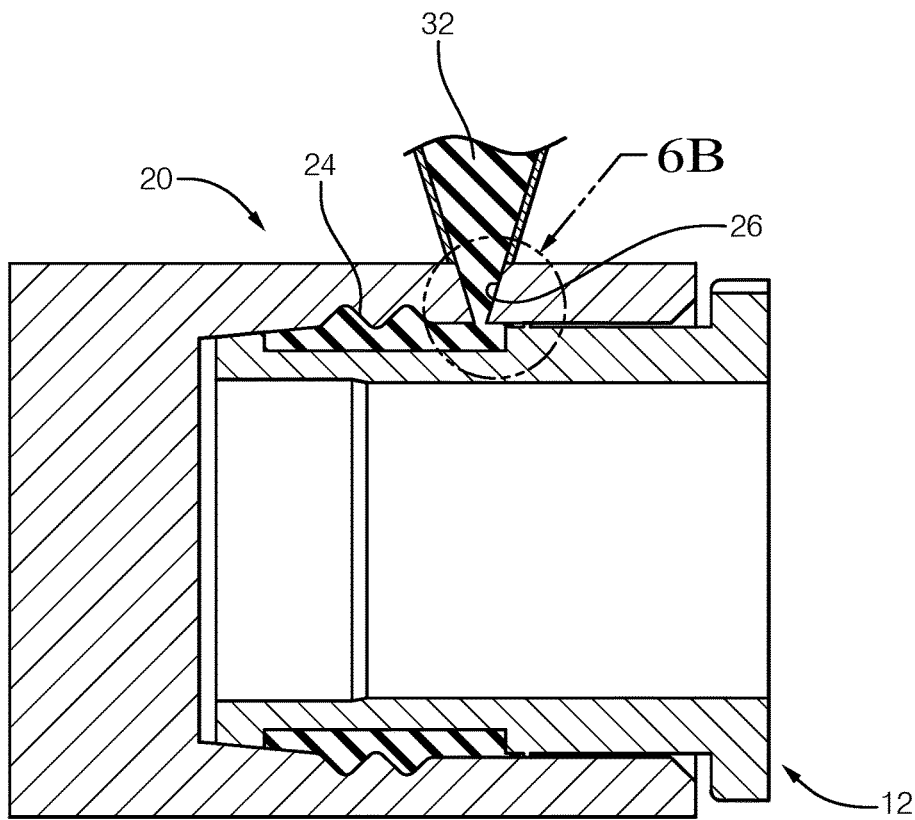
FIG. 6A is a cross section view of the step of introducing a curable resilient material into the port of the mold, thereby filling the second cavity with the resilient material in accordance with one embodiment.
Figure 6B:
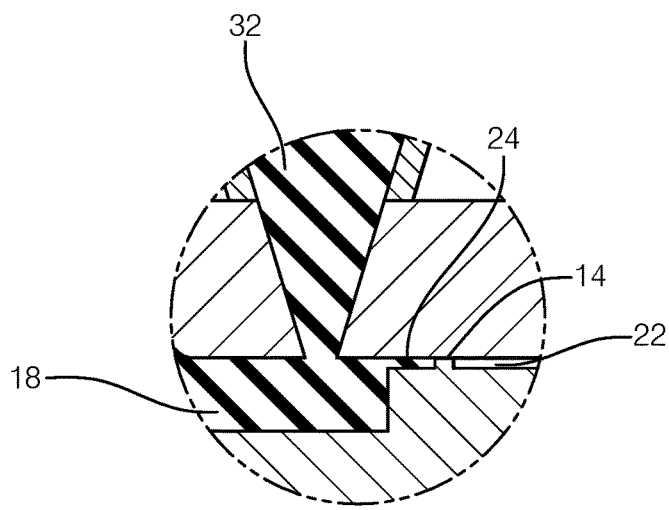
FIG. 6B is a close up cross section view of the rib 14 during the step of introducing a curable resilient material into the port of the mold in accordance with one embodiment.

STEP 108, INTRODUCE A RESILIENT MATERIAL INTO THE PORT, THEREBY FILLING THE SECOND CAVITY, includes introducing a curable resilient material 32 into the port 26, thereby filling the seal cavity 24 and the work piece cavity 18 with the resilient material 32 as illustrated in FIG. 6A. As best shown in FIG. 6B, the intimate contact or deformation of the rib 14 against the inner surface 30 of the receiving cavity 22 forms a dam between the seal cavity 24 and the receiving cavity 22, thereby preventing the liquid resilient material 32 from "flashing" into the receiving cavity 22 and onto the connector body 12.

STET 110, CURE THE RESILIENT MATERIAL, includes curing the resilient material 32 in a known manner for the resilient material selected to form a resilient seal about the connector body 12.

STEP 112, REMOVE THE WORK PIECE FROM THE MOLD, includes removing the connector body 12 with the resilient seal from the mold 20.

Alternative embodiments of the method may be envisioned wherein the outer surface of the work piece defines a second rib that circumferentially protrudes from the outer surface about the longitudinal axis of the work piece. This second rib is preferably located forward of the work piece cavity.

From the foregoing detailed description, it can thus be seen that the present invention provides an improved method 100 for forming a resilient seal about a work piece 12, such as an electrical connector body 12, within a mold 20 in a manner to eliminate flashing. The method 100 of the present invention includes a work piece 12 having a circumferential rib 14 which is deformable to conform to the contour of the receiving cavity 22 so as to create a dam between the work piece 12 and the cavity 22. The deformable rib 14 also serves to compensate for dimensional variations of the work piece 12 and the receiving cavity 22 of the mold 20 such as a work piece 12 that is undersized, has slightly mismatched parting lines, and/or is slightly misshapen.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A method of forming a resilient seal, comprising the steps of:
   providing a work piece defining a rib circumferentially protruding from an outer surface about a longitudinal axis of the work piece, wherein the work piece is an electrical connector body;
   providing a mold, said mold defining:
      a first cavity configured to receive the work piece,
      a second cavity circumferentially extending about the longitudinal axis of the work piece and in communication with the first cavity, and
      a port in communication with the second cavity;
   inserting the work piece within the first cavity such the rib is circumferentially in contact with an inner surface of the first cavity; and
   introducing a curable resilient material into the port, thereby filling the second cavity with the resilient material;
   curing the resilient material; and
   removing the work piece from the mold.

2. The method according to claim 1, wherein the rib is at least partially deformed as the work piece is inserted within the first cavity.

3. The method according to claim 2, wherein the work piece defines a third cavity circumferentially extending about the longitudinal axis and wherein the third cavity is in communication with the second cavity when the work piece is inserted within the first cavity.

4. The method according to claim 3, wherein the rib has a generally square cross sectional profile.

5. The method according to claim 4, wherein a height of the rib is 0.04 mm and a width of the rib is 0.04 mm.

6. The method according to claim 3, wherein the rib is located rearward of the third cavity.

7. The method according to claim 1, wherein the curable resilient material is a silicone based material.

8. The method according to claim 1, wherein the work piece is formed of a material selected from the list consisting of polybutylene terephthalate (PBT), polyethylene terephthalate (PET), polyamide (PA), polycarbonate (PC), polypropylene (PP), and acrylonitrile butadiene styrene (ABS).

9. The method according to claim 1, wherein the mold is a unitary mold and wherein the work piece is inserted into the first cavity through an opening defined by the first cavity.

10. The method according to claim 1, wherein a hardness of the mold is greater than a hardness of the work piece.

* * * * *